(12) United States Patent
Leavitt

(10) Patent No.: US 12,486,928 B2
(45) Date of Patent: Dec. 2, 2025

(54) ANTI-ROTATIONAL PIPE COUPLING

(71) Applicant: Aqseptence Group, Inc., New Brighton, MN (US)

(72) Inventor: Clarence Leavitt, Forked River, NJ (US)

(73) Assignee: JOHNSON SCREENS, INC., New Brighton, MN (US)

( * ) Notice: Subject to any disclaimer, the term of this patent is extended or adjusted under 35 U.S.C. 154(b) by 0 days.

(21) Appl. No.: 18/026,271

(22) PCT Filed: Sep. 14, 2021

(86) PCT No.: PCT/US2021/050284
§ 371 (c)(1),
(2) Date: Mar. 14, 2023

(87) PCT Pub. No.: WO2022/056469
PCT Pub. Date: Mar. 17, 2022

(65) Prior Publication Data
US 2023/0358347 A1    Nov. 9, 2023

Related U.S. Application Data

(60) Provisional application No. 63/078,296, filed on Sep. 14, 2020.

(51) Int. Cl.
*F16L 15/08* (2006.01)
*F16L 15/00* (2006.01)

(52) U.S. Cl.
CPC ............. *F16L 15/08* (2013.01); *F16L 15/008* (2013.01)

(58) Field of Classification Search
CPC ....... F16L 15/08; F16L 15/008; F16L 37/148; E21B 17/043
See application file for complete search history.

(56) References Cited

U.S. PATENT DOCUMENTS

| | | | | |
|---|---|---|---|---|
| 1,386,210 | A | * | 8/1921 | Thomas ................ F16L 37/252 285/376 |
| 7,654,587 | B2 | | 2/2010 | Gibb et al. |
| 2003/0234536 | A1 | | 12/2003 | Riedy et al. |
| 2005/0160994 | A1 | | 7/2005 | Pollock et al. |
| 2005/0279513 | A1 | * | 12/2005 | Eppink ................ E21B 17/10 166/380 |

(Continued)

OTHER PUBLICATIONS

PCT International Search Report and PCT Written Opinion of the ISA for PCT/US2021/050284, mailed Feb. 16, 2022, 13 pages.

*Primary Examiner* — Zachary T Dragicevich
*Assistant Examiner* — James A Linford
(74) *Attorney, Agent, or Firm* — HUSCH BLACKWELL

(57) ABSTRACT

Apparatus and related method for coupling adjacent pipe lengths, for example, a drop pipe assembly that utilize an intermediate coupling member to prevent rotational disengagement of adjacent pipe lengths under the influence of rotational torque. The coupling member can comprise an internal key feature that physically engages a keyed end on at least one end of a length of pipe. The internal key feature can include key members located on each coupling end of the coupling member such that the key members engage corresponding keyed ends of adjacent lengths of pipe such that the coupling member prevents rotation of the adjacent pipe length relative to each other.

8 Claims, 13 Drawing Sheets

(56) References Cited

U.S. PATENT DOCUMENTS

2018/0252052 A1    9/2018  Attiwell
2021/0254754 A1*   8/2021  Loose .................... H02G 1/00
2021/0348650 A1*  11/2021  Wingerter .............. E21B 17/02

* cited by examiner

ANTI-ROTATIONAL PIPE COUPLING

PRIORITY CLAIM

The present application is a National Phase Entry of PCT Application No. PCT/US2021/050284, filed on Sep. 14, 2021, which claims priority to U.S. Provisional Application Ser. No. 63/078,296 filed Sep. 14, 2020 and entitled "ANTI-ROTATIONAL PIPE COUPLING", all of which are hereby incorporated by reference in their entirety.

TECHNICAL FIELD

The present invention is directed to pipe and pipe connections that are used to prevent unthreading or uncoupling if rotational torque is applied to a connected pipe section. More specifically, the present invention is directed to pipe and pipe connections that use a keyed coupling member at a pipe joint to prevent rotation and/or separation of the pipe joint under the influence of rotational torque applied to a connected pipe member.

BACKGROUND

Individual lengths of pipe are frequently connected in a variety of commercial and industrial settings. One common installation occurs in a water well where a drop pipe is connected to a pump located at the bottom of a well screen. Generally, the drop pipe allows the pump to be raised and lowered within the well while also providing a transport conduit for pumped water from the area of the well screen to a surface location. Typically, drop pipe is built by sequentially adding lengths of pipe as the pump is lowered to the proper well depth.

Conventional methods of assembling drop pipe can lead to several problems. For example, threaded joints between adjacent pipes can become unthreaded if rotational torque is applied to one of the connected pipes. To prevent a threaded uncoupling, some connection designs utilize retaining clips or pins to secure the threaded joint. While this can prevent unthreading, the potential exists for these clips or pins to fall out and become obstacles on the outside of the drop pipe.

Alternatively, some conventional designs utilize adhesives at a joint locations to prevent pipe separation. While the use of adhesives can prevent pipe separation, adhesives have disadvantages including the time required for adhesive application and curing as well that these are permanent connections that cannot be separation at the pipe joint if the drop pipe is lifted or otherwise removed.

As such, it would be advantageous to improve upon current pipe and pipe connections so as to resist threaded uncoupling upon application of a rotational torque while similarly providing for separation in the event of drop pipe lifting or removal.

SUMMARY

The present invention is generally directed to embodiments of a drop pipe assembly that utilize an intermediate coupling member to fluidly couple adjacent lengths of pipe while preventing rotational disengagement of the adjacent pipe lengths in the event that rotational torque is applied to the drop pipe assembly. Generally, the coupling member can comprise an internal key feature that physically engages a keyed end on at least one end of the length of pipe. When the coupling member is utilized to connect adjacent length of pipe, the internal key feature can include key members located on each coupling end of the coupling member such that the key members engage corresponding keyed ends of the adjacent lengths of pipe such that the coupling member prevents rotation of the adjacent pipe length relative to each other. In some embodiments, the internal key feature can be located on only one coupling end of the coupling member such that a second end of the coupling member includes an alternative connection feature, for example, a threaded or clamp style connection feature, that provide for a fluid-tight connection to a well or surface features, for example, a well pump or distribution network at the ends of the drop pipe assembly.

In one aspect, the present invention is directed to pipe length that can be utilized to form a fluid conduit wherein adjacent pipe lengths can be prevented from rotating relative to one another under the influence of rotational torque. A pipe length can comprise a pipe body having a pipe conduit defined between first and second pipe ends. The first and second pipe ends can each comprise a keyed end that can include one or more key grooves defining a key opening. In some embodiments, the key opening can comprise an arcuate or partially-arcuate key shape that is configured to receive a key member. The pipe length can further comprise a circumferential exterior groove proximate the first and second pipe ends, wherein said circumferential exterior groove defines a groove cross-section.

In another aspect, the present invention is directed to a coupling member that can be utilized to prevent unintentional rotation and disengagement of adjacent lengths of pipe, for example, in a drop pipe assembly. The coupling member can comprise a coupling body having a coupling conduit defined between a first coupling end and a second coupling end. The first and second coupling ends can be configured to accept slidable insertion of a pipe end. The coupling member can comprise a key feature defined within the coupling conduit. The key feature can comprise a circumferential inner wall so as to define a pair of oppositely facing flanged interior surfaces. One or more key assemblies can project outward from the flanged interior surface and toward the first and second coupling ends respectively. Each key assembly can comprise a key member defining a key shape configured to slidably advance into a key opening. The first and second coupling ends can each include a circumferential sealing groove and a circumferential retention grooved defined on an interior wall of the coupling body. In some embodiments, the coupling member can comprise an alternative coupling feature at the second coupling end such that the second coupling end can be fluidly coupled to a well pump or surface distribution feature at the ends of a drop pipe assembly.

In yet another aspect, the present invention is directed to a method for assembly pipe conduits such as, for example, drop pipe assemblies, such that adjacent lengths of pipe are prevented from rotational disengaging under the influence of rotational torque. Generally, the method can comprise advancing a first end of a first pipe length into a first coupling end of a coupling member. Preferably, the method further comprises compressing a sealing member such as, for example, an o-ring seal so as to define a fluid-tight seal between the coupling member and the first pipe length as insertion occurs. The method can further comprise advancing the first end into the first coupling end such that a key opening on the first end advances over a key member defined on an inner wall of the coupling member. The method can further comprise advancing the first pipe length into the coupling member until the first end physically contacts an interior flanged surface defined on a circumferential inner wall of the coupling member and the key member is fully enclosed by the key opening. The method can further comprise inserting a connecting member, for example, a spline, through an insertion aperture on the coupling member, whereby the insertion aperture provides access to a combined connector groove defined by aligning a circumferential exterior groove and a circumferential retention groove on the first pipe length and the coupling member respectively. In some embodiments, the method can be repeated with a second length of pipe and a second coupling end of the coupling member to join adjacent length of pipe. Alternatively, the second coupling end can include an alternatively coupling feature such that the method further comprises attaching the second coupling end to a well or surface feature at an end of the drop pipe assembly.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
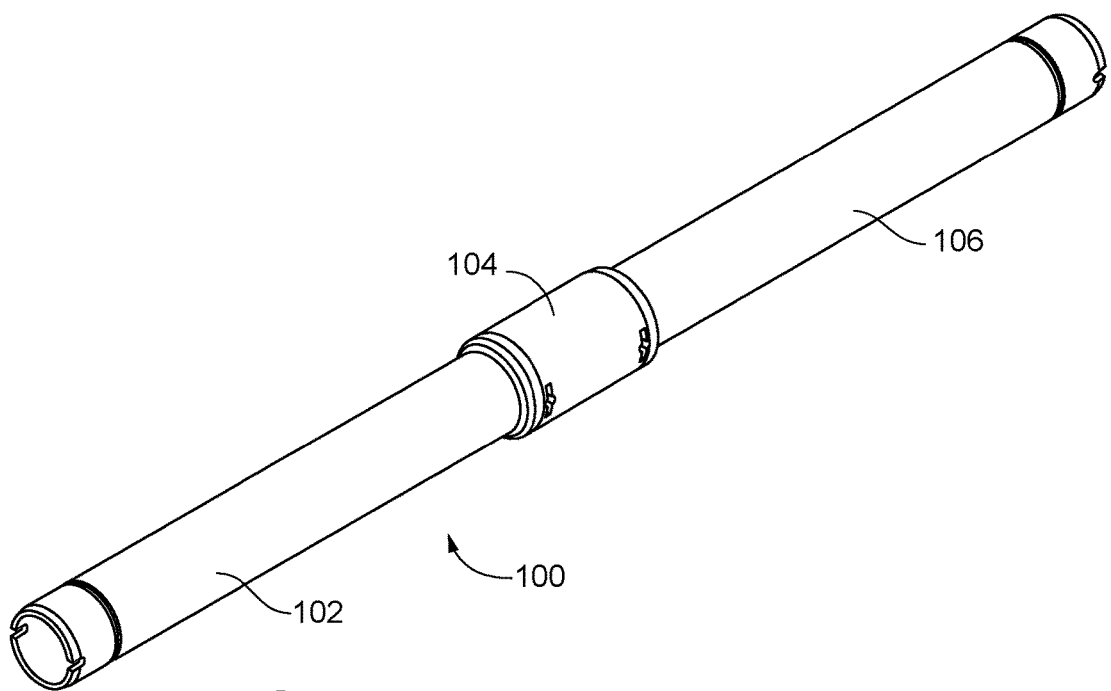
FIG. 1 is a perspective view of a drop pipe assembly according a representative embodiment of the present invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Figure 2:
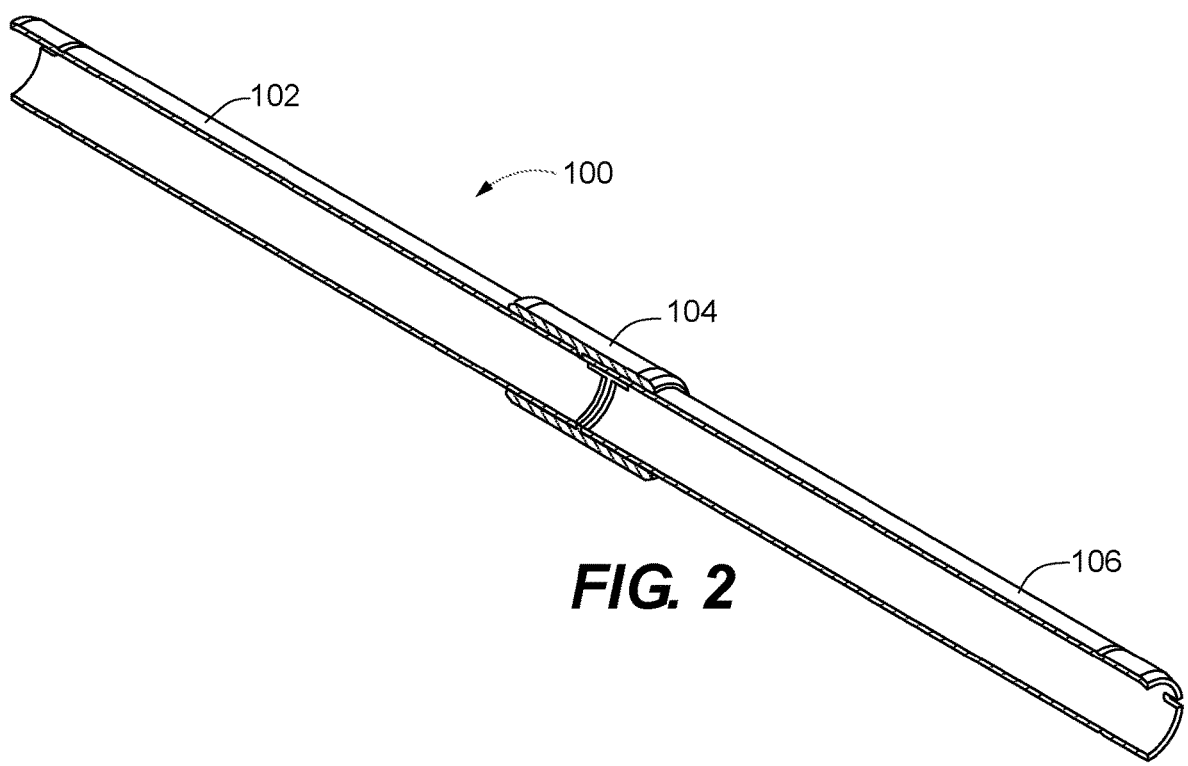
FIG. 2 is a section view of the drop pipe assembly of FIG. 1.

As illustrated in FIGS. 1 and 2, a drop pipe assembly 100 according to a representative embodiment of the present invention can comprise a first pipe length 102, a coupling member 104 and a second pipe length 106. For purposes of the present disclosure, first pipe length 102 and second pipe length 106 can be constructed to be copies of one another though it will be understood that all that is required for the drop pipe assembly 100 is that both first pipe length 102 and second pipe length 106 each have a pipe end compatible with coupling member 104 as will be subsequently described. First pipe length 102, coupling member 104 and second pipe length 106 can generally be fabrication of a single material such as, for example, suitable metallic materials such as carbon or stainless steel or polymeric materials including, for example, polyvinyl chloride (PVC), high density polyethylene (HDPE), fiberglass and other suitable polymers.

Figure 3:
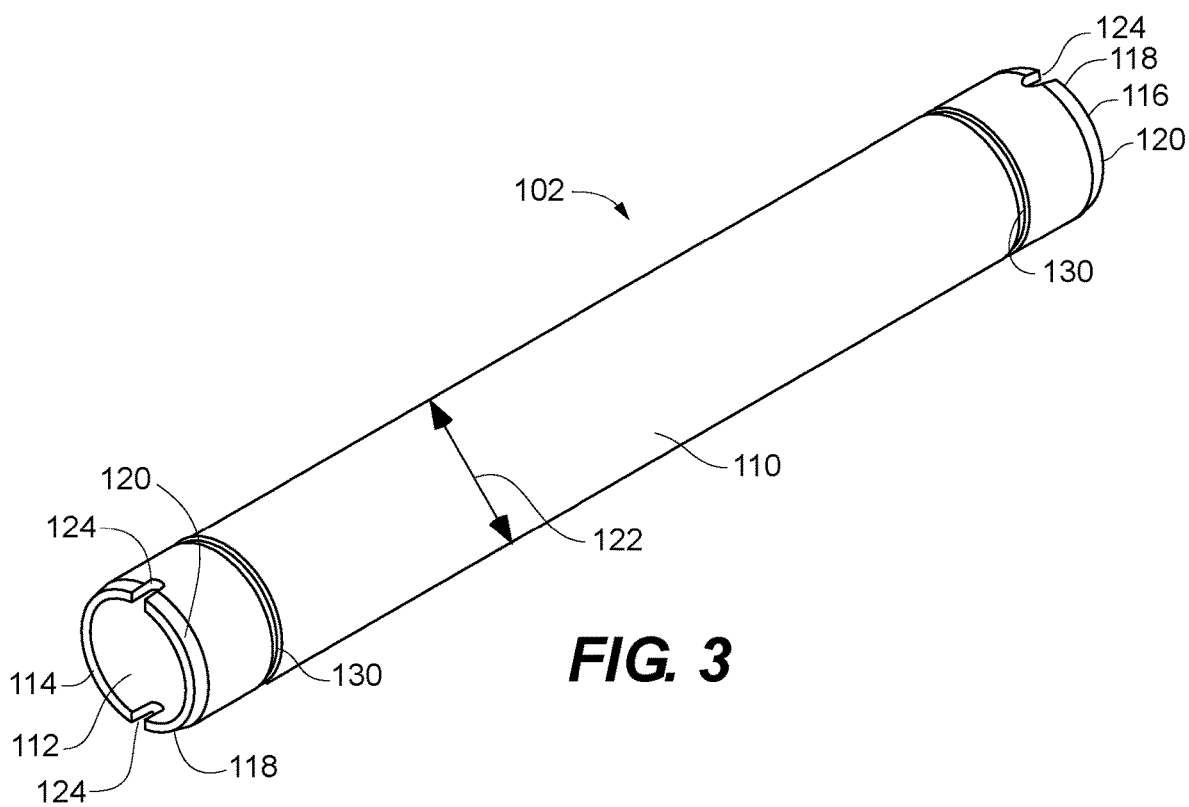
FIG. 3 is a perspective view of a first pipe length according to a representative embodiment of the present invention.
Figure 4:
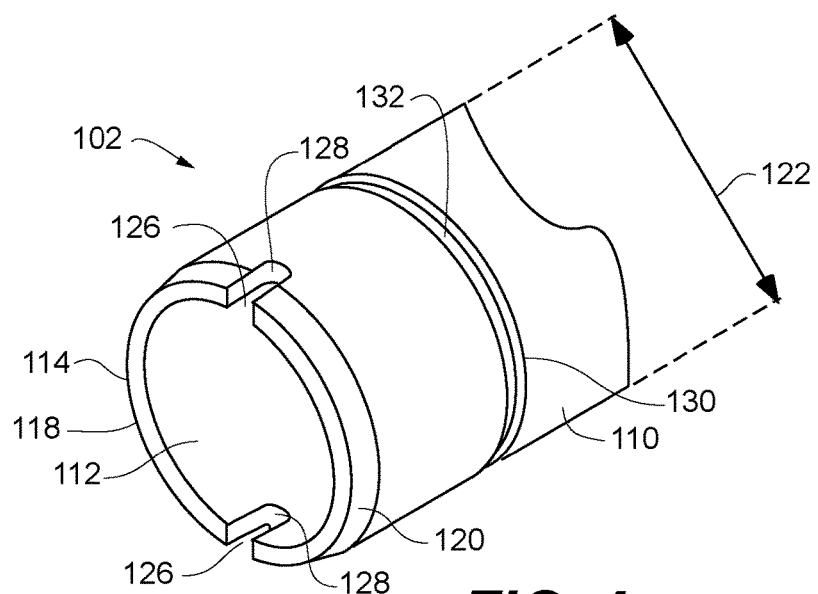
FIG. 4 is a detailed, perspective view of a first end of the first pipe length of FIG. 3.

Referring now to FIGS. 3 and 4, first pipe length 102 generally comprises a pipe body 110 defining a continuous pipe conduit 112 between a first end 114 and a second end 116. First end 114 and second end 116 can be identical, for example, when the first pipe length 102 constitutes an intermediate length of pipe within a drop pipe or alternatively, first end 114 and second 116 can comprise different connection styles, for example, when the first pipe length 102 constitutes an end of a drop pipe and will be connected to a well pump or surface component at one end of the pipe body 110. As such, at least one of the first end 114 and second end 116 comprises a keyed end 118 for interfacing with the coupling member 104. Generally, the keyed end 118 defines a tapered end wall 120 that tapers to the pipe body 110. Pipe body 110 generally defines a pipe exterior diameter 122. Keyed end 118 generally defines at least one key groove 124 defining a key opening 126 within the pipe body 110. Key opening 126 can be configured to have a variety of key shapes 128, for example, arcuate or partially arcuate, as illustrated in FIGS. 3 and 4. At a location beyond the tapered end wall 120, the pipe body 110 can define a circumferential exterior groove 130 defining a groove cross-section 132. While only first pipe length 102 is presently described, it will be understood that second pipe length 106 will have similar structure.

Figure 5:
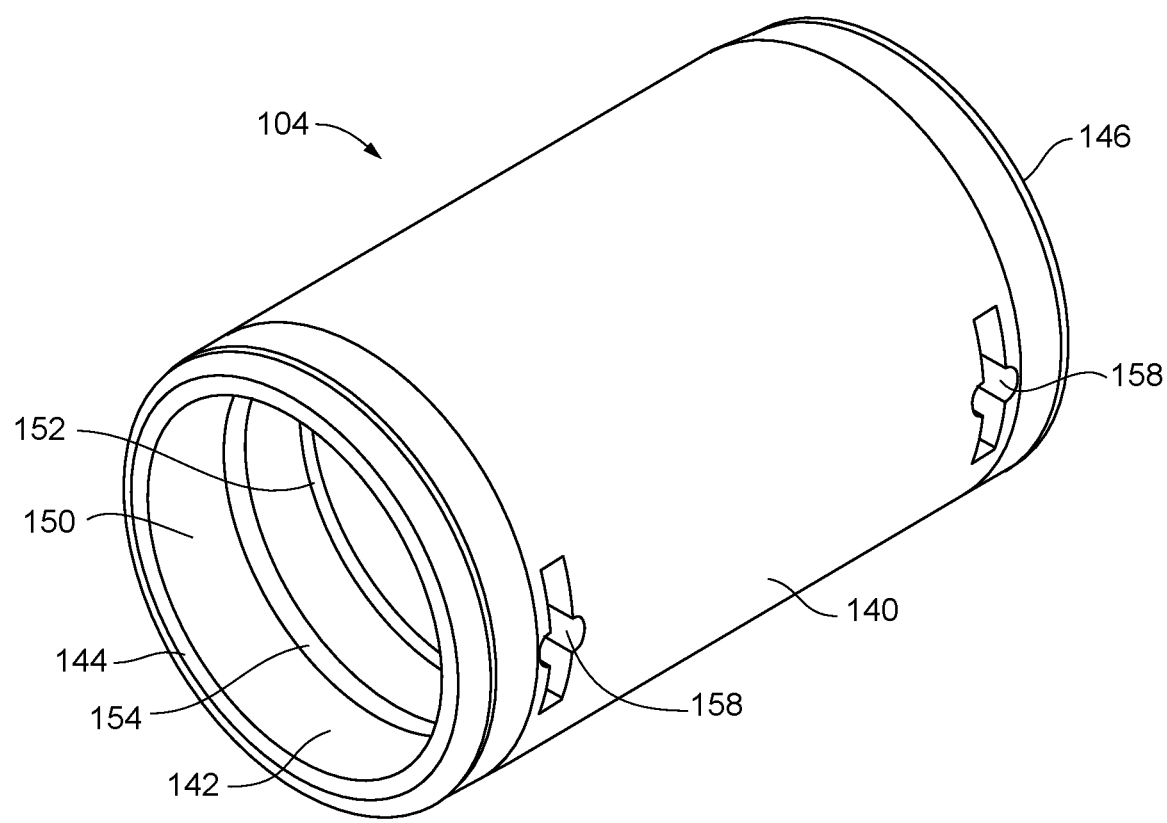
FIG. 5 is a perspective view of a coupling member according to a representative embodiment of the present invention.
Figure 6:
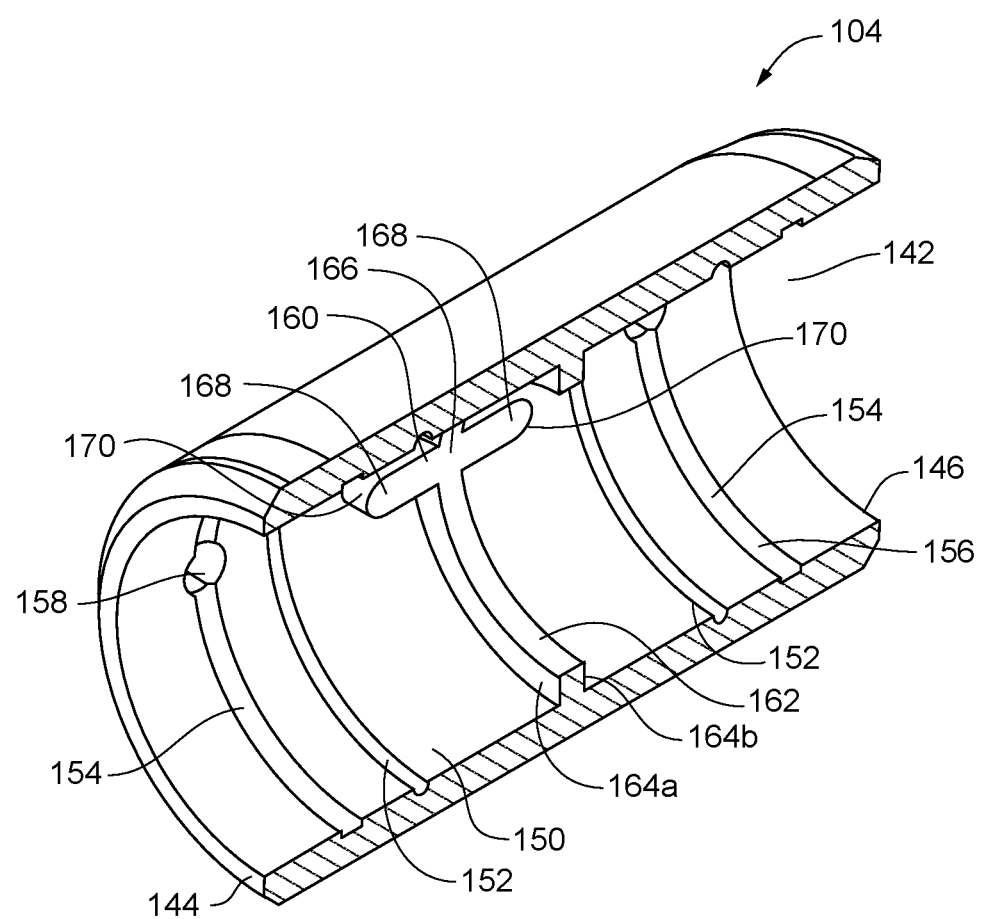
FIG. 6 is a section view of the coupling member of FIG. 5.
Figure 7:
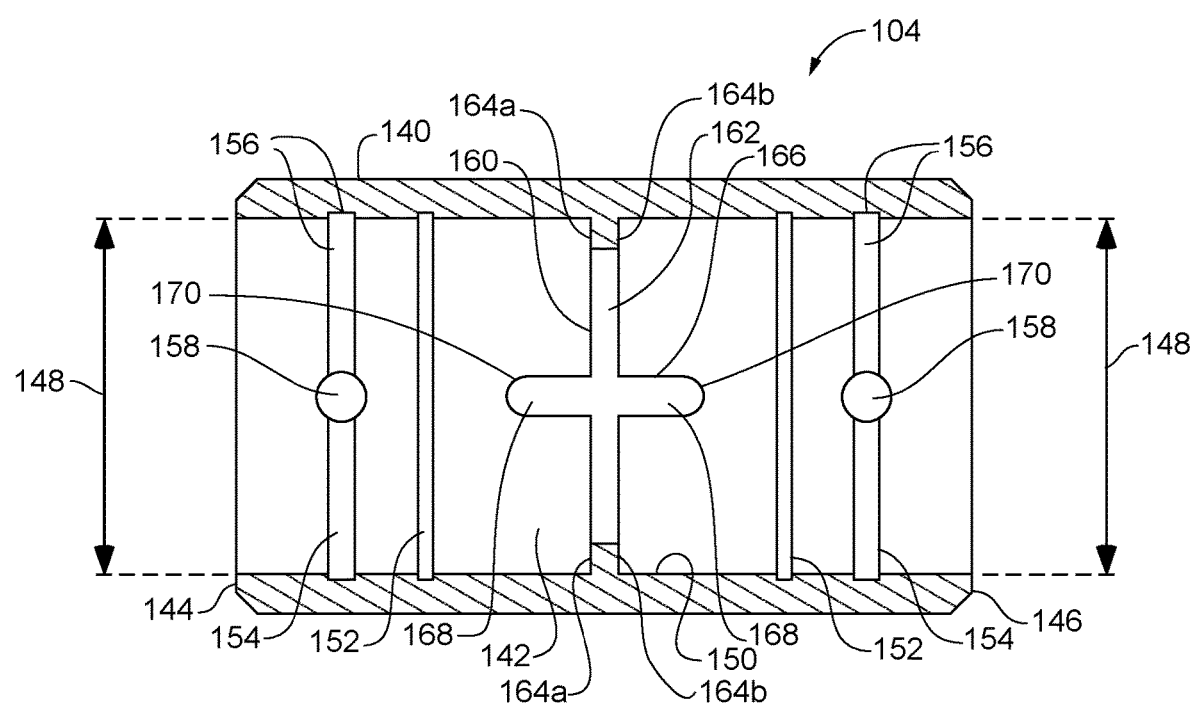
FIG. 7 is a section view of the coupling member of FIG. 5.
Figure 8:
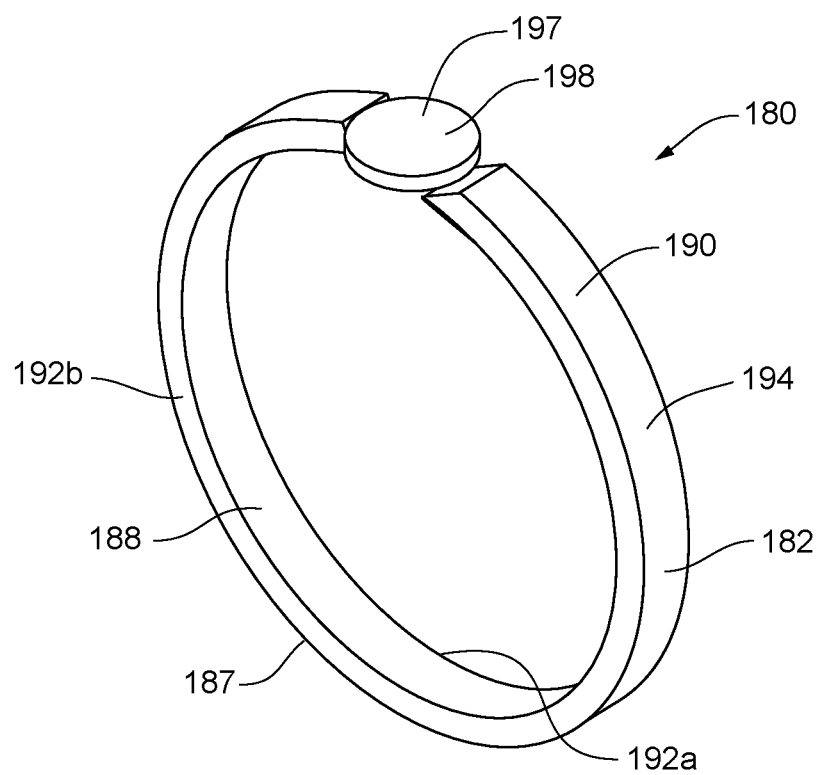
FIG. 8 is a perspective view of a connecting member according to a representative embodiment of the present invention.
Figure 9:
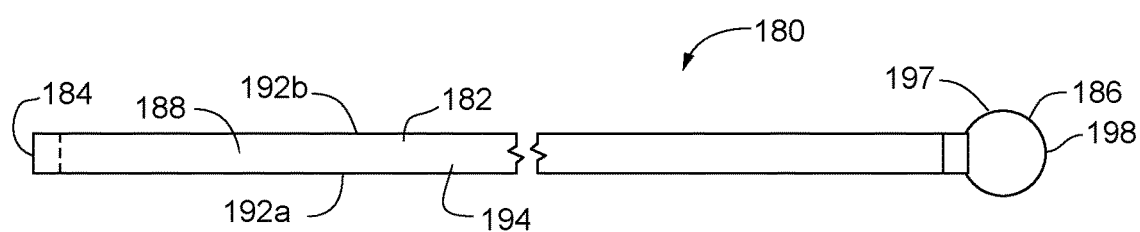
FIG. 9 is a plan view of the connecting member of FIG. 8.
Figure 10:
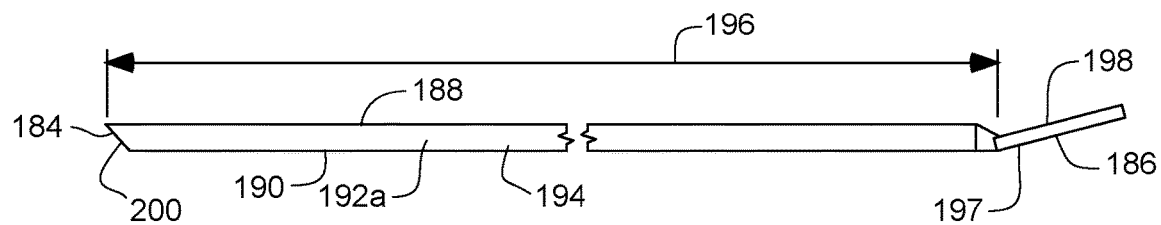
FIG. 10 is a side view of the connecting member of FIG. 8.
Figure 11:
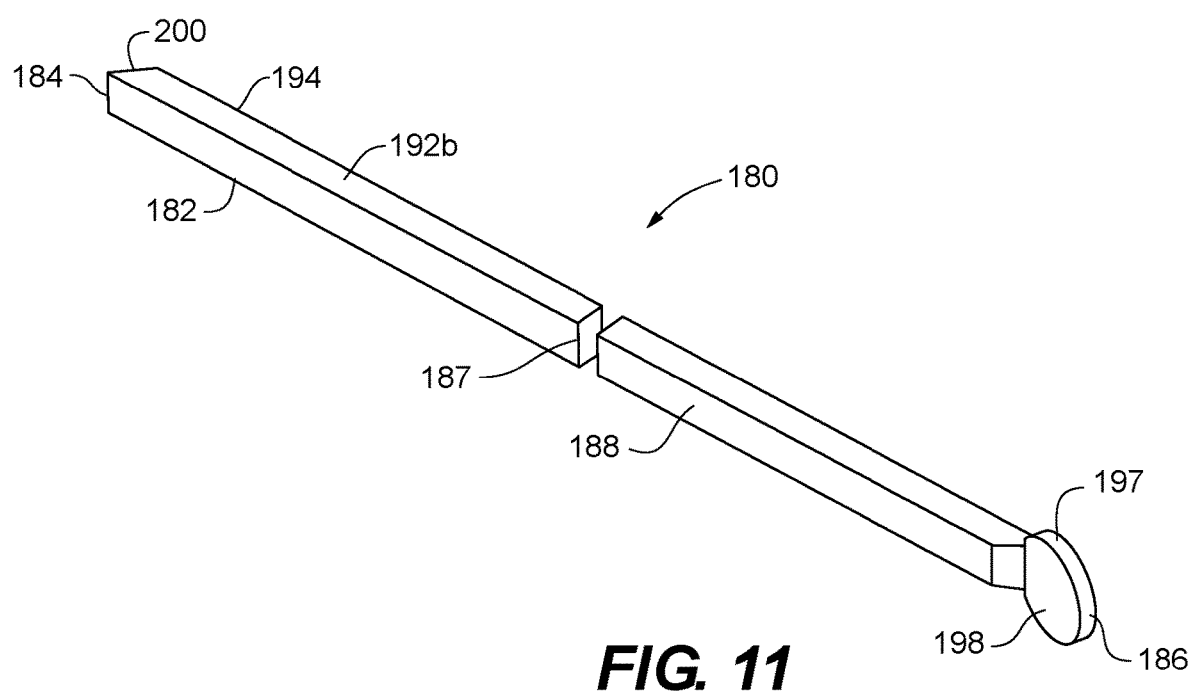
FIG. 11 is a perspective view of the connecting member of FIG. 8.
Figure 12:
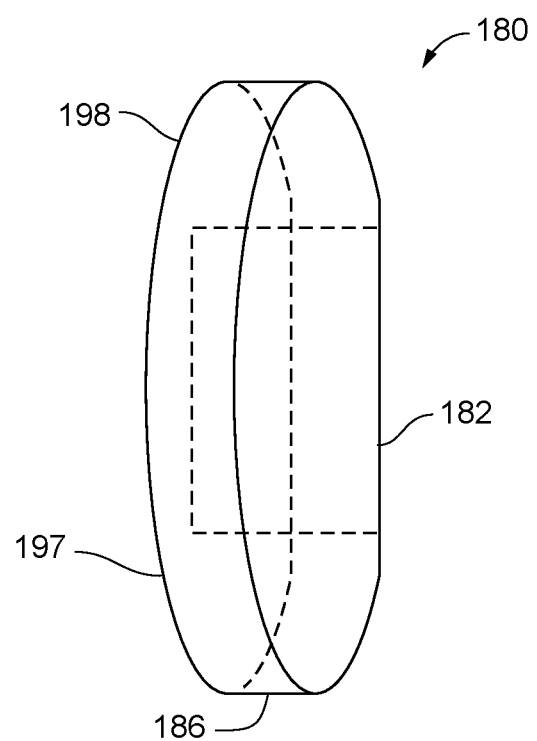
FIG. 12 is an end view of the connecting member of FIG. 8.
Figure 13:
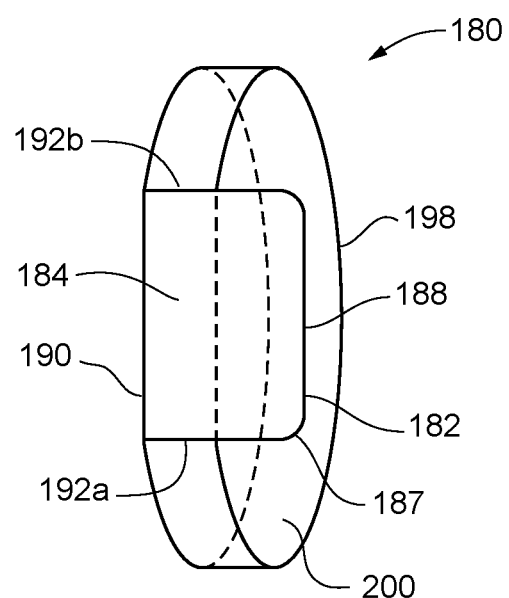
FIG. 13 is an opposite end view of the connecting member of FIG. 8.

As illustrated in FIGS. 5, 6 and 7, coupling member 104 generally comprises a coupling body 140 defining a continuous coupling conduit 142 between a first coupling end 144 and a second coupling end 146. The coupling body 140 generally defines a coupling inner diameter 148 that is selected to slightly exceed the pipe exterior diameter 122. Coupling body 140 defines an interior wall 150. Proximate the first coupling end 144 and the second coupling end 146, the interior wall 150 includes a circumferential sealing groove 152 and a circumferential retention groove 154. Circumferential retention groove 154 can include a retention groove cross-section 156 that can be similar to groove cross-section 132. Coupling body 140 can further comprise an insertion aperture 158 that is in communication with the circumferential sealing groove 152. Coupling body 140 can further comprise a key feature 160 defined within the continuous coupling conduit 142. Generally, the key feature 160 includes a circumferential inner wall 162 defining a pair of flanged interior surfaces 164a, 164b and a key assembly 166. Key assembly 166 can comprise a pair of oppositely projecting key members 168 with at least a portion of each key member 168 extending parallel to a central axis of the continuous coupling conduit 142. Each key member 168 can comprise a key shape 170 that is sized and shaped to be received within the key opening 126. For example, each key member 168 can comprise an arcuate or partially arcuate portion that interfaces with a similar portion of the key opening 126. In some embodiments, the coupling body 140 can comprise multiple key assemblies 166 defined around the interior wall 150, for example, two key assemblies 166 at opposite sides (spaced 180° apart) of the interior wall 150, three key assemblies 166 spaced 120° apart, four key assemblies 166 space 90° apart and so on. The number of key assemblies 166 within the coupling body 140 can be selected to provide desired resistance to rotational torque. Generally, the number of key assemblies 166 will match the number of key grooves 124 on the first end 114 and/or second end 116.

As seen in FIGS. 8, 9, 10, 11, 12 and 13, a representative connecting member, for example, a spline 180 generally comprises a spline body 182 including an insertion end 144 and a manipulation end 186. The spline body 182 can comprise a square or rectangular cross-section 187 defined by a top surface 188, a bottom surface 190 and a pair of side surfaces 192a, 192b. The spline body 182 generally comprises a retention portion 194 having a retention length 196 and a manipulation portion 197. Manipulation portion 197 can comprise an angled tab 198 or similar feature that promotes grabbing or coupling. Insertion end 184 can define an angled surface 200. The spline 180 is generally fabricated of a flexible polymeric material such as, for example, nylon and similar ductile materials.

Figure 14:
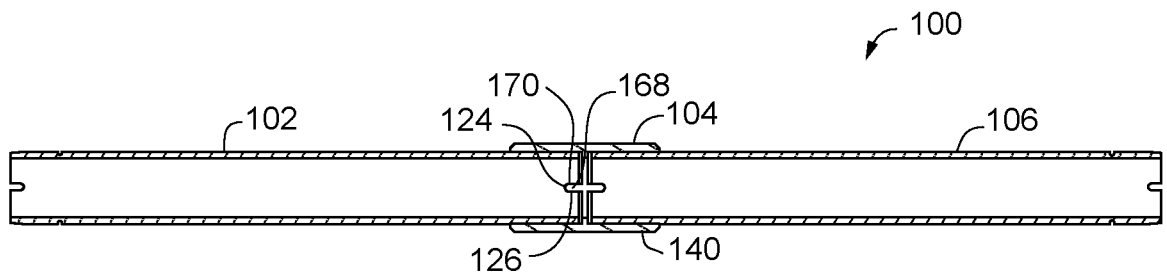
FIG. 14 is a section view of the drop pipe assembly of FIG. 1.
Figure 15:
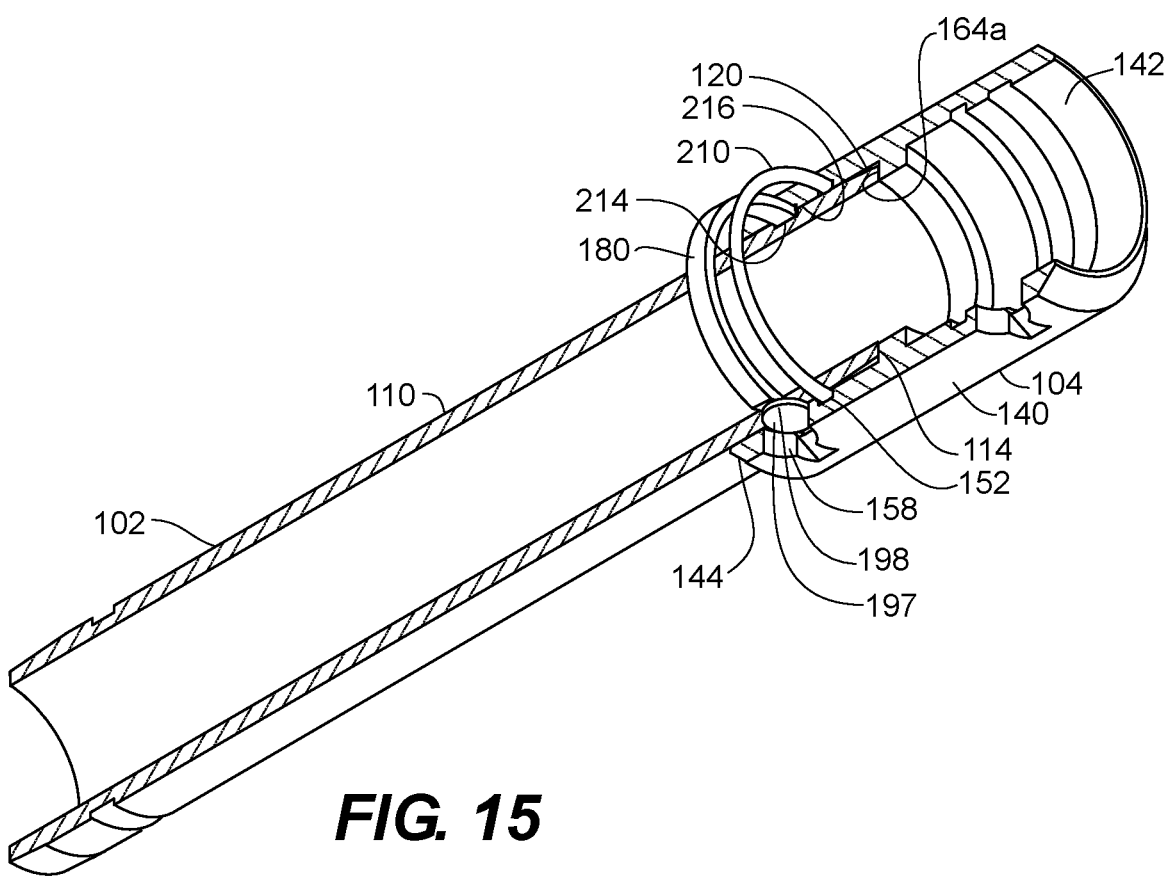
FIG. 15 is a section view of the first pipe length of FIG. 3 coupled to the coupling member of FIG. 5.

While the assembly of first pipe length 102, coupling member 104 and second pipe length 106 is generally described below, it will be understood that in real-world installations, for example, assembly of drop pipe for a water well, that this installation generally occurs at the top of a well head as the well pump is dropped to a desired well depth. Generally, coupling member 104 is prepared for assembly by positioning a sealing member 210, for example, a polymeric o-ring, within the circumferential sealing groove 152 as shown in FIGS. 14 and 15. Next, the first pipe length 102 is positioned such that the first end 114 is proximate the first coupling end 144. The tapered end wall 120 is slidingly advanced into the first coupling end 144 such that the pipe body 110 is advanced into the continuous coupling conduit 142. The first end 114 continues to be inserted as the key opening 126 slides over the key member 170. The pipe body 110 continues to be advanced into the continuous coupling conduit 142 until further advancement is prevented by the tapered end wall 120 contacts the flanged interior surface 164a and the key member 168 fills the key groove 124. At this point, the advancement of the pipe body 110 into the continuous coupling conduit 142 results in the sealing member 210 becoming compressed between the pipe body 110 and the coupling body 140 so as to create a fluid-tight seal between the first pipe length 102 and the coupling member 104.

With the first end 114 fully inserted into the continuous coupling conduit 142, the circumferential exterior groove 130 and the circumferential retention groove 154 are aligned with another to define a combined connector groove 214. Generally, the groove-cross section 132 and the retention groove cross-section 156 cooperatively defined a combined connector groove cross-section 216 that substantially matches the cross-section 187 of the spline body 182. Once the combined connector groove 214 is defined, a user can then slidably introduce the insertion end 184 of the spline 180 through the insertion aperture 158 such that the insertion end 184 enters into the combined connector groove 214. Using the manipulation portion 197, the user continues to advance the spline body 182 through the insertion aperture 158 such that the insertion end 184 is advanced circumferentially through the combined connector groove 204. The retention length 196 is preferably selected to equal the circumferential length of the combined connector groove 204. As such, the insertion end 184 travels circumferentially around the combined connector groove 204 and approaches the insertion aperture 158. At that point, the angled tab 198 can be snapped into and reside with the insertion aperture 158. With the spline 180 in combined connector groove 204, first end 114 cannot be removed from the continuous coupling conduit 142 such that a continuous, fluid-tight conduit is defined between the first pipe length 102 and the coupling member 104. This method of attachment can be repeated for second pipe length 106 or for any number of lengths of pipe such as during the assembly of drop pipe to place a well pump at a desired well depth.

With the drop pipe assembly 100 assembled as described, the application of rotational torque to first pipe length 102, second pipe length 104 or any other connected pipe length will not cause disassembly or failure of the pipe connections. With each key member 170 inserted into a corresponding key groove 124, any rotational torque applied to a pipe length will cause either rotation of the entire drop pipe assembly 100 or none of the drop pipe assembly 100 if the torque applied is not enough to rotate the entire drop pipe assembly. As such, rotational torque cannot cause adjacent pipe lengths to spin relative to one another and the drop pipe assembly 100 can be maintained in a fully assembled, fluid tight configuration.

To disassemble the pipe, a user simply grasps the angled tab 198 by hand or with an appropriate tool and pulls the spline 180 out of the combined connector groove 204. Following removal of the spline 180, a user can simply pull the first end 114 from the continuous coupling conduit 142 so as to disassemble adjacent lengths of pipe.

Figure 16:
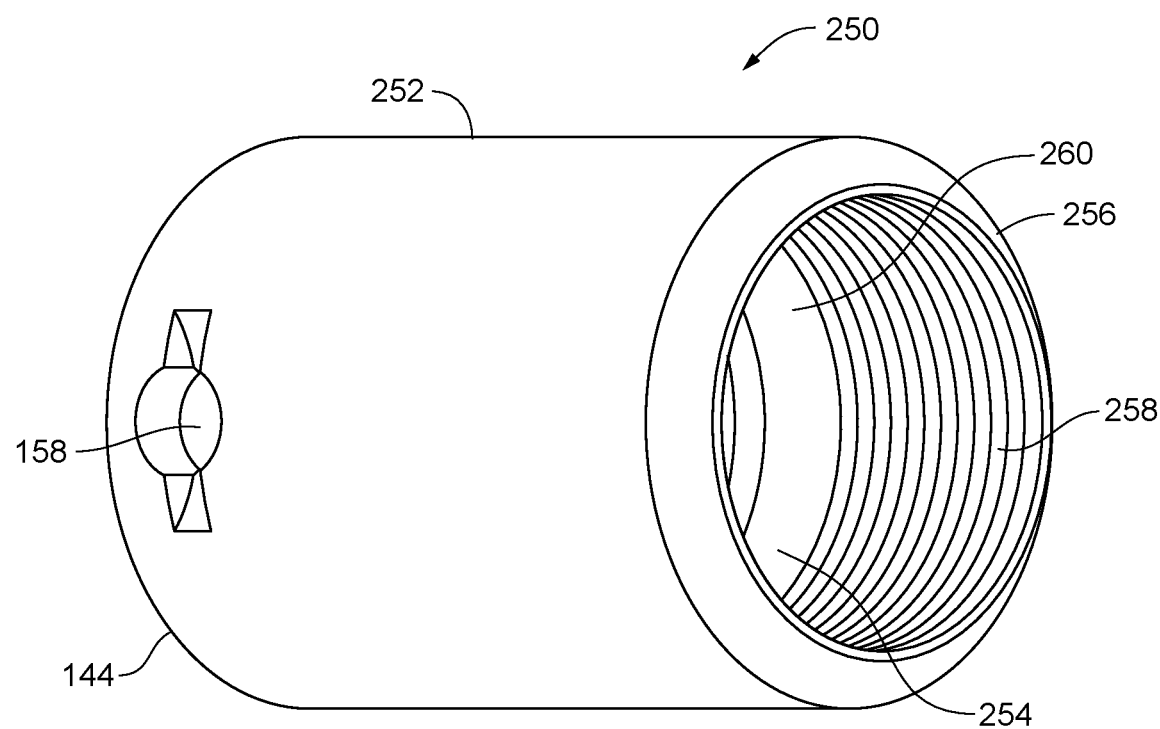
FIG. 16 is a perspective view of a coupling member according to a representative embodiment of the present invention.
Figure 17:
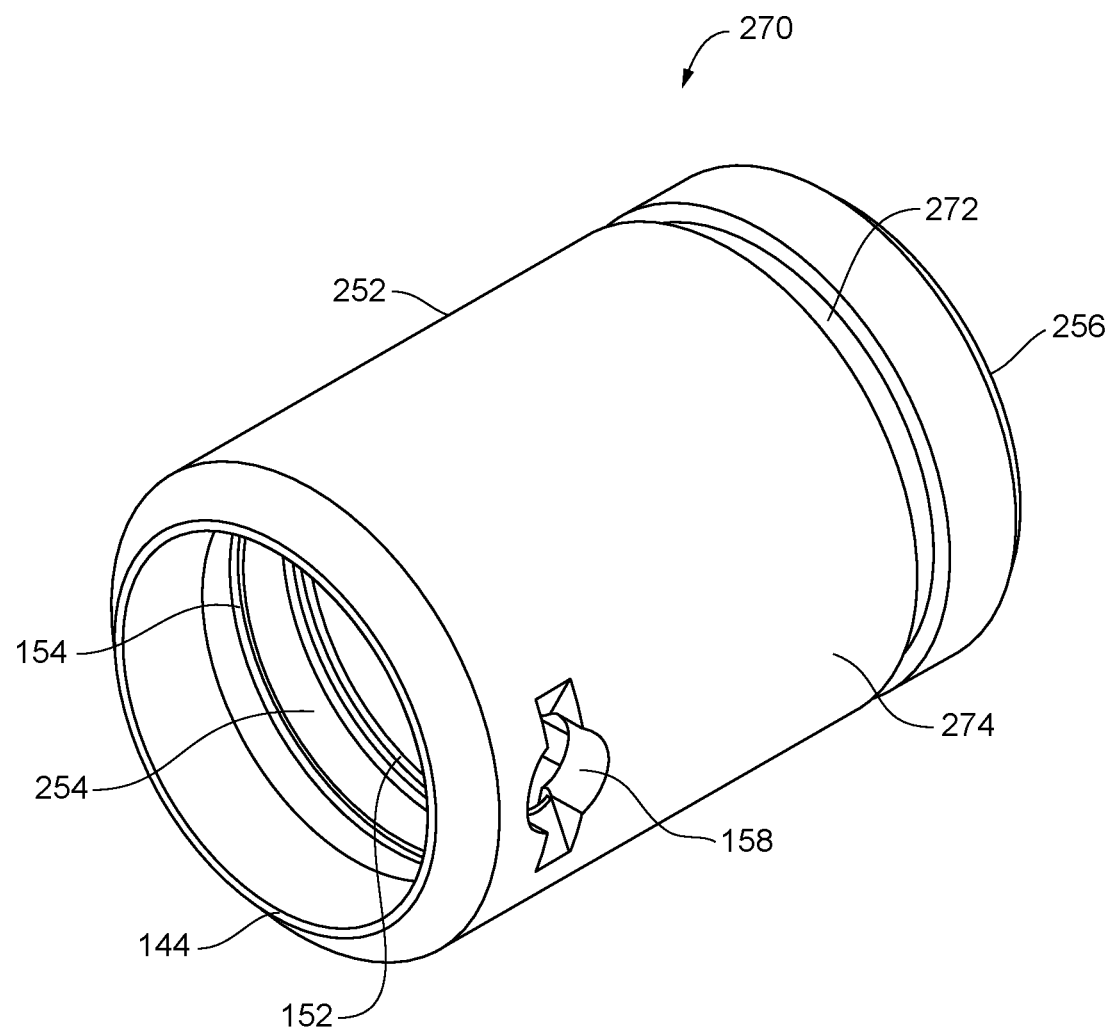
FIG. 17 is a perspective view of a coupling member according to a representative embodiment of the present invention.

Referring now to FIGS. 16 and 17, alternative embodiments of coupling members 250 and 270 respectively are illustrated. Generally, coupling members 250 and 270 can share various features of the coupling member 104 but generally only at one end as coupling members 250 and 260 can be utilized to fluidly connect drop pipe assembly 100 to features at either end of the drop pipe assembly 100, for example, a well pump or a surface distribution feature. With reference to FIG. 16, coupling member 250 generally comprises a coupling body 252 that defines a continuous coupling conduit 254 between first coupling end 144 and a second coupling end 256. First coupling end 144 can be substantially the same as that previously described with respect to the coupling member 104 including the various dimensions and features previously described that provide for an anti-rotational connection to first and second pipe lengths 102, 104. Instead, the difference between coupling member 250 and coupling member 104 are the features found at the second coupling end 256 which is configured for attachment to other well or surface features. Coupling end 256 can comprise an internal thread 258 defined on an inner wall 260 of the coupling body 252 to provide for a rotational, threaded connection to the well or surface feature. In a similar manner, and as shown in FIG. 17, second coupling end 256 of the coupling member 270 can comprise a connecting groove 272 on an exterior wall 274 of the coupling body 252. Connecting groove 272 can provide for a mechanical, clamp-style connection between the second coupling end 256 and the well or surface feature. For example, connecting groove 272 can be configured to use Victaulic style mechanical connectors to create a fluid-tight connection between the coupling member 270 and the well or surface feature. Through the use of one or more of coupling members 250, 270 where the drop pipe assembly 100 connects to well or surface features, an installer can use the same configuration of pipe lengths, for example, first and second pipe length 102, 106 when assembling the drop pipe assembly 100 and utilize a desired configuration of coupling members 250, 270 in connecting the drop pipe assembly 100 to the well pump or surface distribution feature. This eliminates potential mistakes as pipe lengths are assembled and eliminates the need to manufacture pipe lengths that have different first and second ends 114, 116.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

The invention claimed is:

1. A pipe assembly resistant to unintentional disassembly in response to a rotational torque, the pipe assembly comprising:
    a first pipe length having a pipe conduit defined between a first end and a second end, said first end including a key groove, the first pipe length further comprising a circumferential exterior groove proximate the first end, said circumferential exterior groove defining a groove cross-section;
    a coupling member defining a coupling conduit between a first coupling end and a second coupling end, the coupling member including a circumferential inner wall within the continuous coupling end, said circumferential inner wall defining a pair of flanged interior surfaces with at least one key member extending toward the first coupling end from the flanged interior surface proximate the first coupling end, the coupling member further comprising a circumferential retention groove defining in the coupling conduit proximate the first connecting end, said circumferential retention groove defining a retention groove cross-section and wherein the coupling member further comprises an insertion aperture in communication with the circumferential retention groove; and
    a connecting member adapted for manipulation through the insertion aperture, wherein the connecting member comprises a spline connector having a spline body, the spline body including an insertion end and a manipulation end, the spline body having a body cross-section,
    wherein insertion of the first end into the first coupling end defines a continuous fluid conduit between the pipe conduit and the coupling conduit, said insertion of the first end into the first coupling end directing the key groove over the key member such that the key member is positioned within the key groove when the first end contacts the flanged interior surface proximate the first coupling end,
    wherein a combined connector groove is defined by the circumferential exterior groove and the circumferential retention groove when the key member is positioned within the key groove, the combined connector groove having a combined connector groove cross-section that matches the body cross-section,
        wherein the insertion end is advanced through the insertion aperture and into the combined connector groove such that the connecting member retains connection of the coupling member and the first pipe length, and
    wherein the presence of the key member within the key groove prevents rotation of the first pipe length relative to the coupling member.

2. The pipe assembly of claim 1, wherein the coupling member further comprises a circumferential sealing groove defined in the coupling conduit, the circumferential sealing groove located between the circumferential retention groove and the flanged interior surface proximate the first coupling end, and wherein the pipe assembly further comprises:
    a sealing member positioned within the circumferential sealing groove, said sealing member being compressed between the coupling member and the first pipe length as the first end is inserted into the first coupling end and past the circumferential retention groove.

3. The pipe assembly of claim 1, wherein the insertion end defines a retention length and wherein the retention length is equal to a circumferential length of the combined connector groove.

4. The pipe assembly of claim 3, wherein the manipulation end includes a tab, and wherein the tab can reside within the insertion aperture when the retention length is within the combined connector groove.

5. The pipe assembly of claim 1, further comprising:
    a second pipe length having a second pipe conduit defined between a second pipe first end and a second pipe second end, said second pipe first end including a second key groove, the second pipe length further comprising a second circumferential exterior groove proximate the second pipe first end, said second circumferential exterior groove defining the groove cross-section; and a second connecting member comprising the spline connector, wherein the second coupling end includes at least one second end key member extending toward the second coupling end from the flanged interior surface proximate the second coupling end, wherein the coupling member further comprising a second circumferential retention groove defined in the coupling conduit proximate the second connecting end, said second circumferential retention groove defining the retention groove cross-section and wherein the coupling member further comprises a second insertion aperture in communication with the circumferential retention groove, wherein insertion of the second pipe first end into the second coupling end defines an assembly fluid conduit between the first pipe length, the coupling member and the second pipe length, said insertion of the second pipe first end into the second coupling end directing the second key groove over the second end key member such that the second end key member is positioned within the second key groove when the second pipe first end contacts the flanged interior surface proximate the second coupling end, wherein a second combined connector groove is defined by the second circumferential exterior groove and the second circumferential retention groove when the second key member is positioned within the second key groove, the second combined connector groove having the combined connector groove cross-section that matches the body cross-section of the second connector, wherein the insertion end of the second connector is advanced through the second insertion aperture and into the second combined connector groove such that the second connecting member retains connection of the coupling member and the second pipe length, and wherein the presence of the second end key member within the second key groove prevents rotation of the second pipe length relative to the coupling member.

6. The pipe assembly of claim 1, wherein the second coupling end defines a second connection different from the first coupling end, said second connection configured to fluidly connect the coupling member to well or surface feature.

7. The pipe assembly of claim 6, wherein the second connection comprises a clamp connection or a threaded connection.

8. A drop pipe for insertion into a water well comprising the pipe assembly of claim 1.

* * * * *